H. FORD.
MOTOR VEHICLE.
APPLICATION FILED SEPT. 1, 1906.
1,012,620.
Patented Dec. 26, 1911.
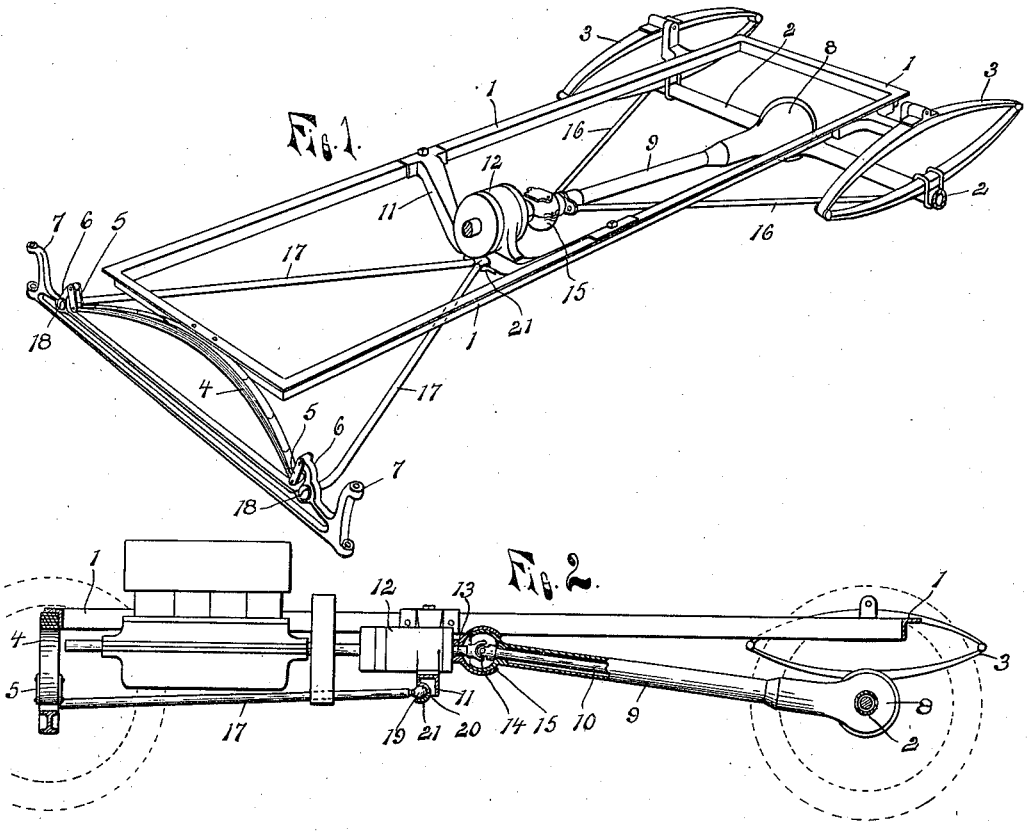
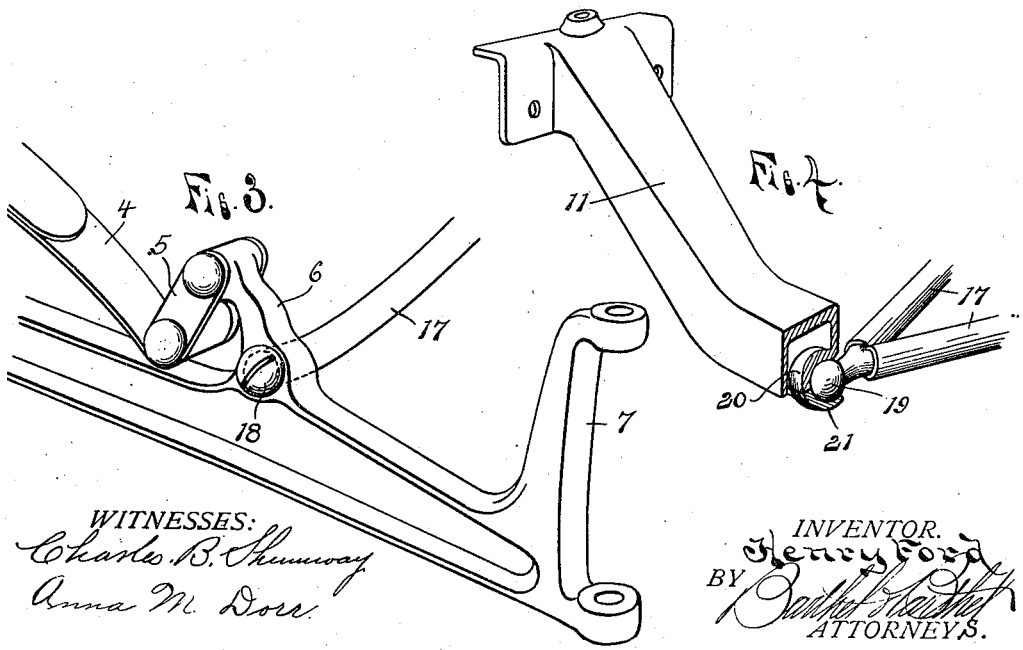
WITNESSES:
Charles B. Shumway
Anna M. Dorr
INVENTOR.
Henry Ford
BY
ATTORNEYS.

UNITED STATES PATENT OFFICE.

HENRY FORD, OF DETROIT, MICHIGAN.

MOTOR-VEHICLE.

1,012,620.

Specification of Letters Patent. Patented Dec. 26, 1911.

Application filed September 1, 1906. Serial No. 332,920.

*To all whom it may concern:*

Be it known that I, HENRY FORD, a citizen of the United States of America, residing at Detroit, in the county of Wayne and State of Michigan, have invented certain new and useful Improvements in Motor-Vehicles, of which the following is a specification, reference being had therein to the accompanying drawings.
This invention relates to an improved running gear for self-propelled vehicles, and its object is to so support the frame upon and attach the same to the axles as to make a very flexible running gear which will permit the wheels to freely rise or fall relative to the frame without subjecting said frame to adverse torsional strains or transmitting sudden shocks, jolts or jars to the body of the vehicle, and which at the same time will effectually hold the axles in their proper transverse relation to the frame without employing the supporting springs for that purpose, thus relieving said springs from the strain of securing the axles to the frame.
To this end the invention consists in providing means forming a reach connection for the front axle, attached to said axle at one end and at its opposite end provided with a universal joint for attaching said end to the vehicle frame, similar means being employed, if so desired, to hold the rear axle, and the two universal joints are located near together intermediate the ends of said frame which frame is supported upon the axles by springs.

The invention further consists in the particular construction arrangement and combination of parts, all as hereinafter more fully described, reference being had to the accompanying drawings in which:—

Figure 1, is a perspective view of a running gear embodying the invention; Fig. 2, a longitudinal vertical section of the same; Fig. 3, is a perspective view of one end of the front axle; and Fig. 4, a perspective view of one end of the hanger or cross bar forming a support for the universal joint of the front reach rods and showing the same in transverse section through the joint.
As shown in the drawings 1 is the rectangular vehicle frame supported at its rear end upon the sleeve or casing 2 for the rear axle shaft, by elliptical springs 3 clipped to the sleeve and pivotally attached to the frame in the usual manner, and at its forward end said frame is supported by a semi-elliptical spring 4 extending longitudinally of the front axle and attached thereto at its ends by links 5 pivotally attached to upwardly extending curved arms or hangers 6 formed integral with the front axle which is provided with an integral knuckle member 7 at each end forming one member of each steering knuckle for the attachment of the front wheels. The rear axle sleeve is formed with the usual gear casing 8 for the bevel gear drive and extending forwardly from said casing and rigidly attached thereto is a tubular casing or sleeve 9 inclosing the driving shaft 10. A drop-hanger or cross bar 11 is secured by bolts to the side bars of the frame 1 and extends downward and across between said bars midway between the ends of said frame and forms a rigid support for the casing 12 of the change-speed transmission, the shaft 13 of which projects rearwardly from the casing and is connected to the driving shaft 10 by a universal joint 14. A globular enlargement on the end of the sleeve 9 incloses the universal joint 14 and a similar globular case is secured to the transmission casing and incloses the enlargement, forming therewith a ball and socket joint 15. Rods 16 are secured at their rear ends to the axle sleeve near its ends and at their opposite ends to the sleeve 9 near the forward end thereof, and thus said sleeve and rods form a reach for the rear axle which is connected to the frame by the ball and socket joint 15.

In the forward axle adjacent to each of the hangers 6 is a hole to receive the forward ends of the tubular rods 17 rigidly secured therein by the screws 18, and converging rearwardly these rods are united by a forked member secured within the ends of said rods and provided with a ball 19 to engage a socket 20 one-half of which is formed on the lower side of the cross bar 11 and the other half in a cap 21 bolted to the hanger. These rods 17 thus form a reach for the forward axle which reach is attached to the frame by the ball and socket joint.

When any one of the wheels of the vehicle strike an obstruction or depression in the road and is thus raised or lowered suddenly, the spring adjacent to that wheel will yield allowing the axle to rise independently of the adjacent corner of the frame, owing to the flexible or universal connection of the reaches to the frame near the middle of said frame, and thus the shock or jolt is to a great extent taken up by the spring and not transmitted to the vehicle body, and the frame is relieved from any severe torsional strains.

Since the reaches are rigidly connected to the axles they are in effect but extensions thereof and being substantially maintained in a horizontal position or nearly so when the vehicle is loaded, it is obvious that the vertical component of any force exerted through the reaches can have no appreciable effect upon the frame and therefore the full compensating effect of the springs is obtained.

It is obvious that with a chain drive, a rear reach similar to the forward reach may be employed or such a reach may be used for the forward axle only. In this construction the reaches form the connections between the axles and the frame, the springs serving simply to support the weight, and the rear reach serves the purpose of distance rods and the forward reach securely holds the front axle against any force tending to move it rearwardly.

Having thus fully described the invention what I claim is—

1. The combination with the frame supported on front and rear axles, of a front axle provided with a rearwardly extending V-shaped brace terminating in a ball, a cross piece secured to the side bars of the frame intermediate the ends thereof and provided with a ball-shaped abutment forming a ball and socket connection with the brace centrally of the frame and a single transverse spring interposed between the front axle and the front end of the frame, the axle being provided with upwardly projecting arms from which the ends of the spring are suspended free to swing laterally, the center of the spring being rigidly connected to the center of the forward end of the frame, said connection forming the sole and only connection between the front axle and the front end of the frame.

2. The combination with the frame supported on front and rear axles, of a front axle provided with a rearwardly extending V-shaped brace rigidly secured thereto and terminating in a ball, a cross piece secured to the frame midway between the axles and provided with a ball shaped abutment for the brace forming a ball and socket connection therewith and a transverse spring interposed between the front axle and the front end of the frame, the front axle being provided with upwardly projecting arms from which the ends of the spring are freely suspended, the arms serving as stops to limit the lateral play of the spring.

3. The combination with the frame supported on front and rear axles, of a front axle provided with upwardly projecting arms near its outer ends, a single transverse spring freely suspended at its ends from said arms and arching upwardly therefrom to support the front end of the frame to the center of which it is rigidly connected, a cross bar united to the side bars of the frame and forming a drop hanger between the front and rear axles, and a V-shaped brace rigidly secured at its forward ends to the spring supporting arms of the front axles and at its rear end connected by a ball and socket connection to the center of the cross bar.

4. The combination with the frame supported on front and rear axles and provided with a central cross bar united to the side bars of the frame and forming a drop hanger to which the axles are connected by ball and socket connections in the center of the cross bar, of a single transverse spring supporting the front end of the frame upon the front axle, the axle being provided near its ends with upwardly projecting inclined arms, and links suspending the spring between the arms in the vertical plane of the axle and freely movable laterally between the arms, the arms forming stops to limit the lateral movement of the front end of the frame in relation to the front axle.

In testimony whereof I affix my signature in presence of two witnesses.

HENRY FORD.

Witnesses:
  OTTO F. BARTHEL,
  CHARLES B. SHUMWAY.